United States Patent [19]

Yamada et al.

[11] Patent Number: 4,692,796

[45] Date of Patent: Sep. 8, 1987

[54] METHOD FOR MANUFACTURING ELECTRIC MASKS USING A COLOR SCANNER AND AN APPARATUS FOR USE THEREIN

[75] Inventors: Mitsuhiko Yamada; Kyohei Fujisawa, both of Kyoto; Hideaki Kitamura, Takatsuki, all of Japan

[73] Assignee: Dainippon Screen Mfg. Co., Ltd., Kyoto, Japan

[21] Appl. No.: 731,559

[22] Filed: May 7, 1985

[30] Foreign Application Priority Data

Jun. 18, 1984 [JP] Japan .................. 59-126193

[51] Int. Cl.[4] ............................................. H04N 1/46
[52] U.S. Cl. .................................... 358/76; 358/75; 358/78
[58] Field of Search ............... 358/75, 78, 76, 280, 358/285

[56] References Cited

U.S. PATENT DOCUMENTS 4,514,767  4/1985  Kubota et al. ............. 358/280
4,577,219  3/1986  Klie et al. .................. 358/78

FOREIGN PATENT DOCUMENTS 58-211155  8/1983  Japan .
2105945    3/1983  United Kingdom .
2121534   12/1983  United Kingdom .
2121645   12/1983  United Kingdom .

Primary Examiner—James J. Groody
Assistant Examiner—Robert M. Bauer
Attorney, Agent, or Firm—Brumbaugh, Graves, Donohue & Raymond

[57] ABSTRACT

A method for manufacturing electric masks characterized by a step of setting a cutout area of the original picture adhered to an input drum by using a color scanner comprising CRT monitor and coordinate input device, a step of roughly scanning the picture in this cutout area at coarser pitch than the scanning pitch in duplicating and recording process, a step of averaging the picture signal obtained by this rough scanning into coarse sampling data, a step of writing this coarse sampling data into the background memory of CRT monitor, a step of displaying thus written coarse sampling data on the CRT monitor as a picture, a step of writing the contour of desired electric mask on the display image by using the coordinate input device while observing this display image and displaying on the control memory, a step of making an electric mask by painting out the contour and writing the electric mask data obtained at this time into the control memory, and a step of reading out the electric mask data written in the control memory at the time of subsequent usual scanning in tune with the generation timing of the image data, and a step of masking the image data in real time; and an apparatus for use therein.

2 Claims, 34 Drawing Figures

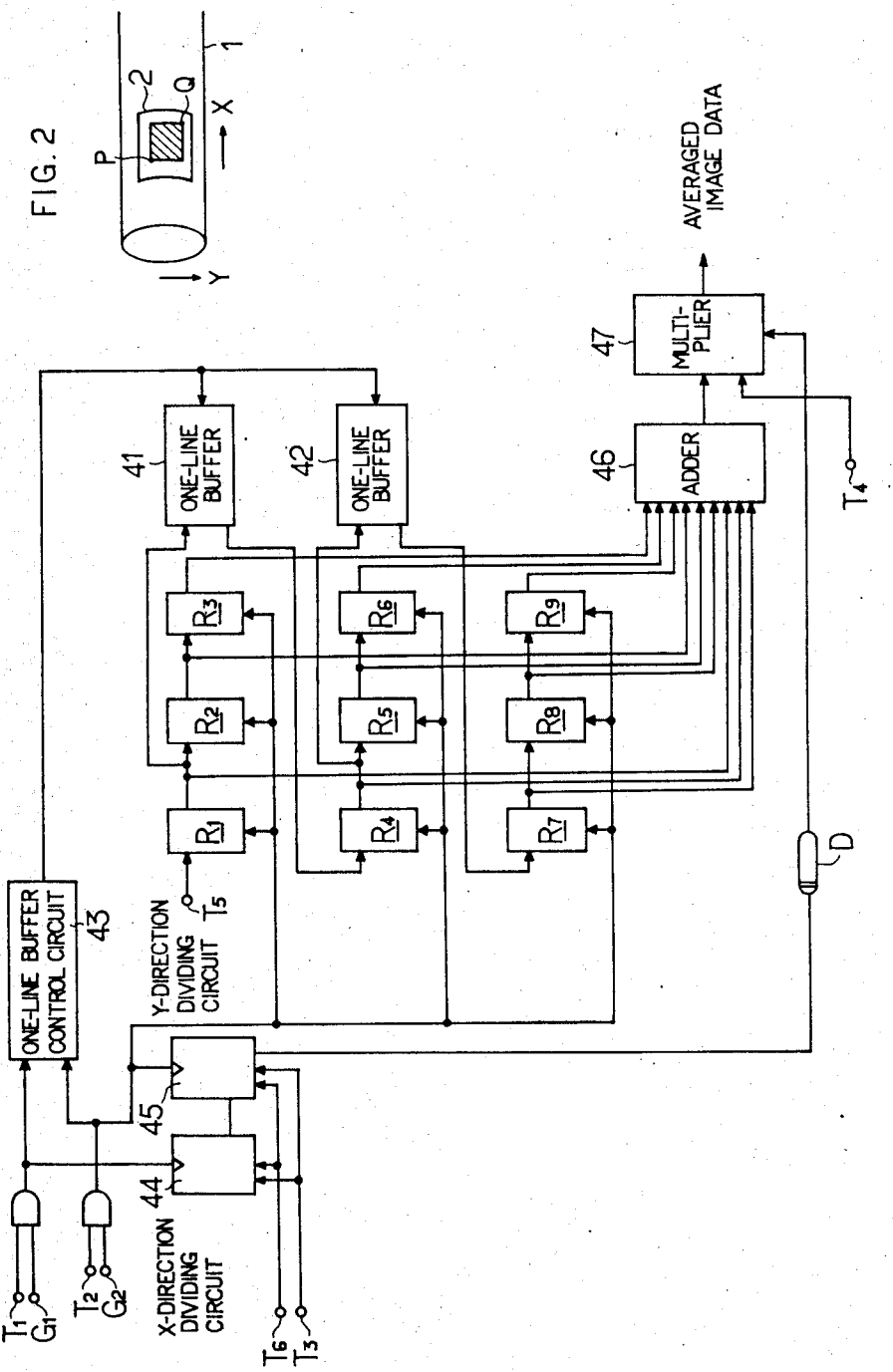

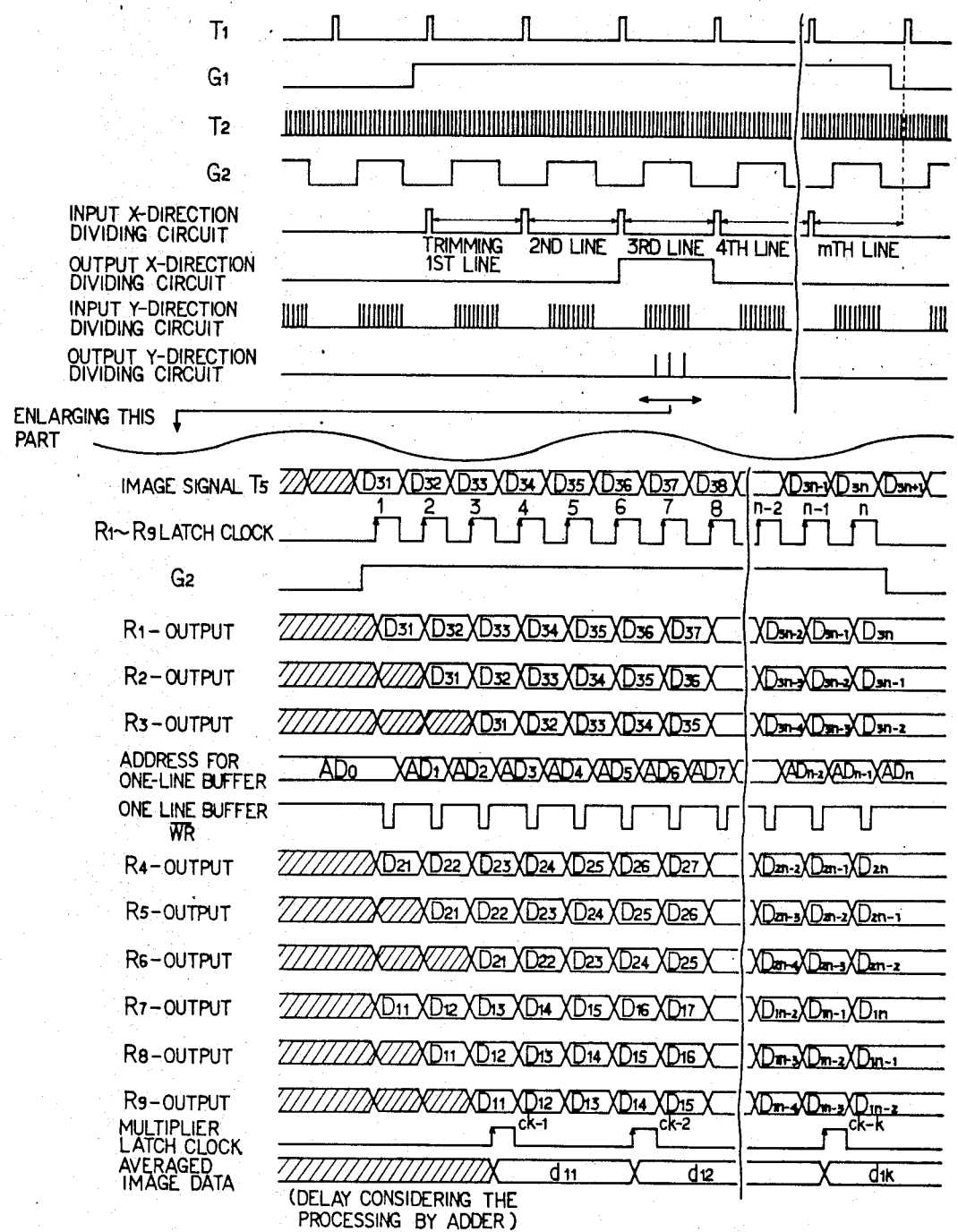
FIG. 3-b

FIG.3-c
FIG.3-d
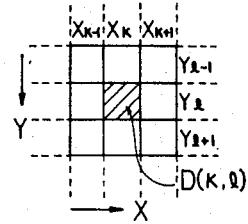
FIG.5
FIG.4
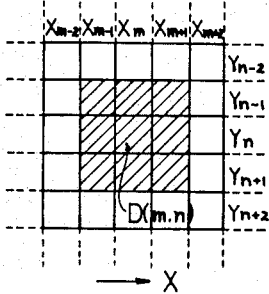
FIG.6
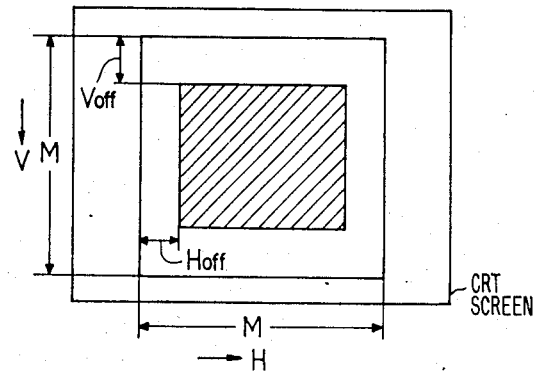
FIG.7
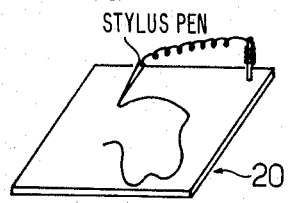
FIG.8
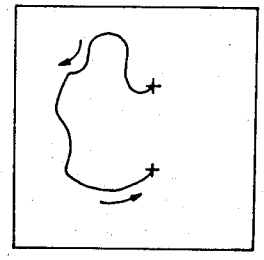

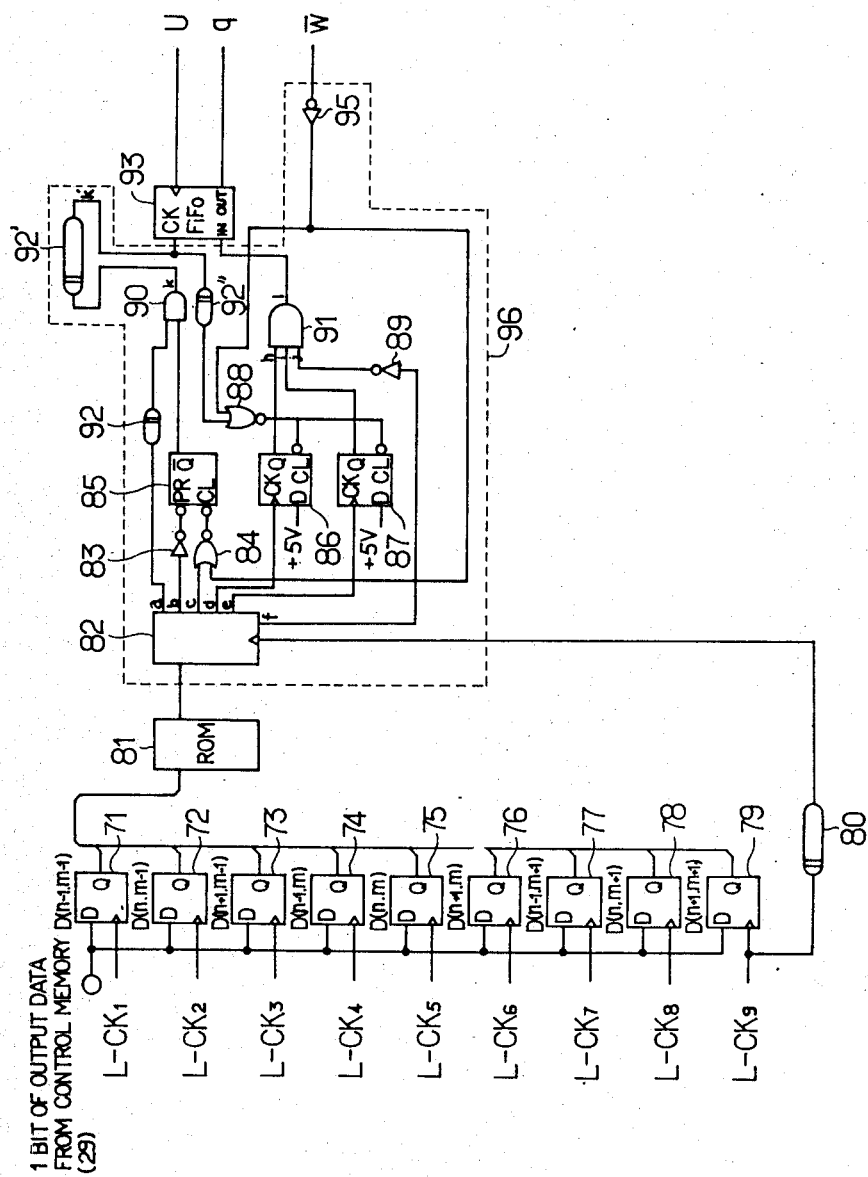
FIG.11-a

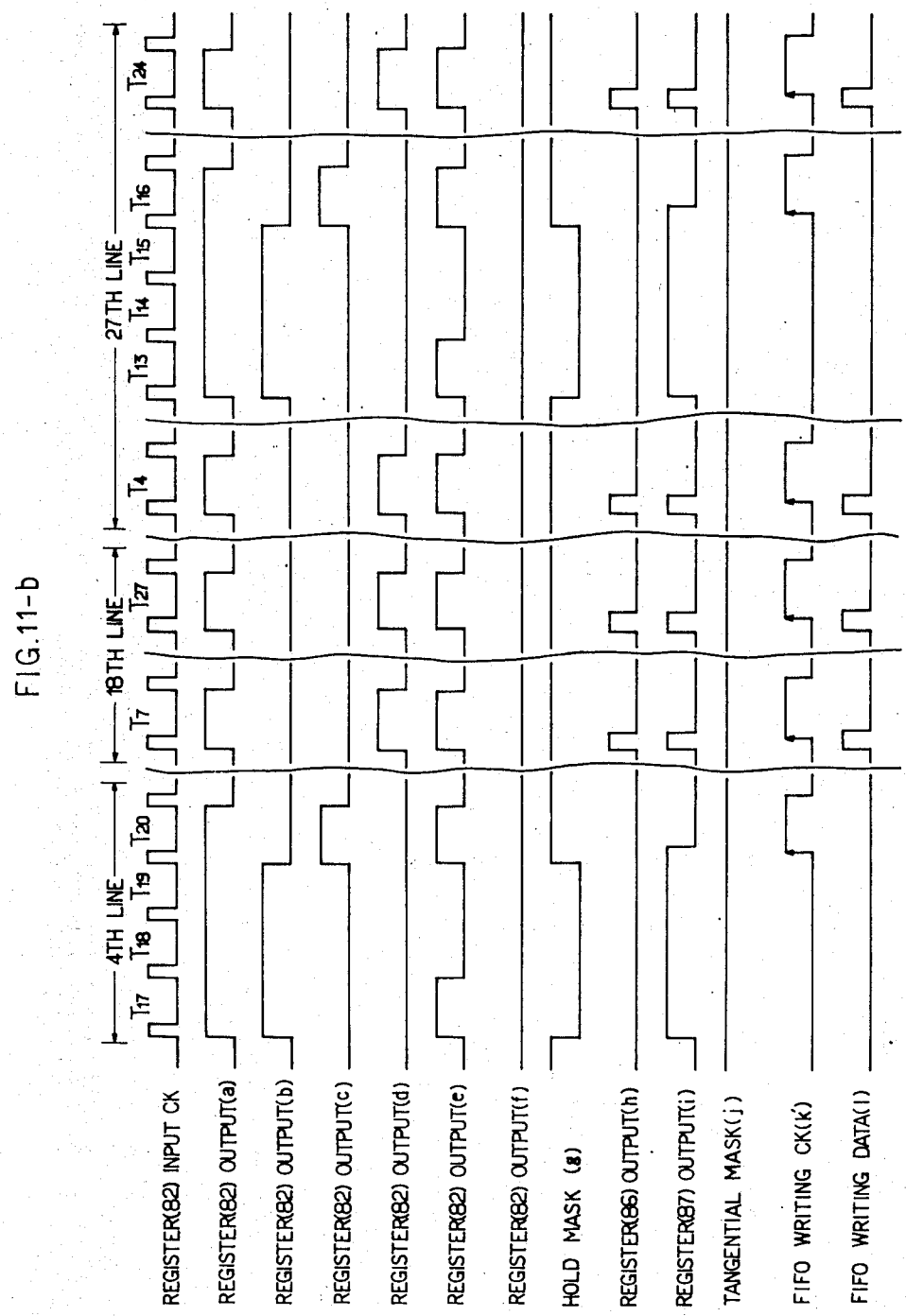
FIG.11-b

FIG.12-a
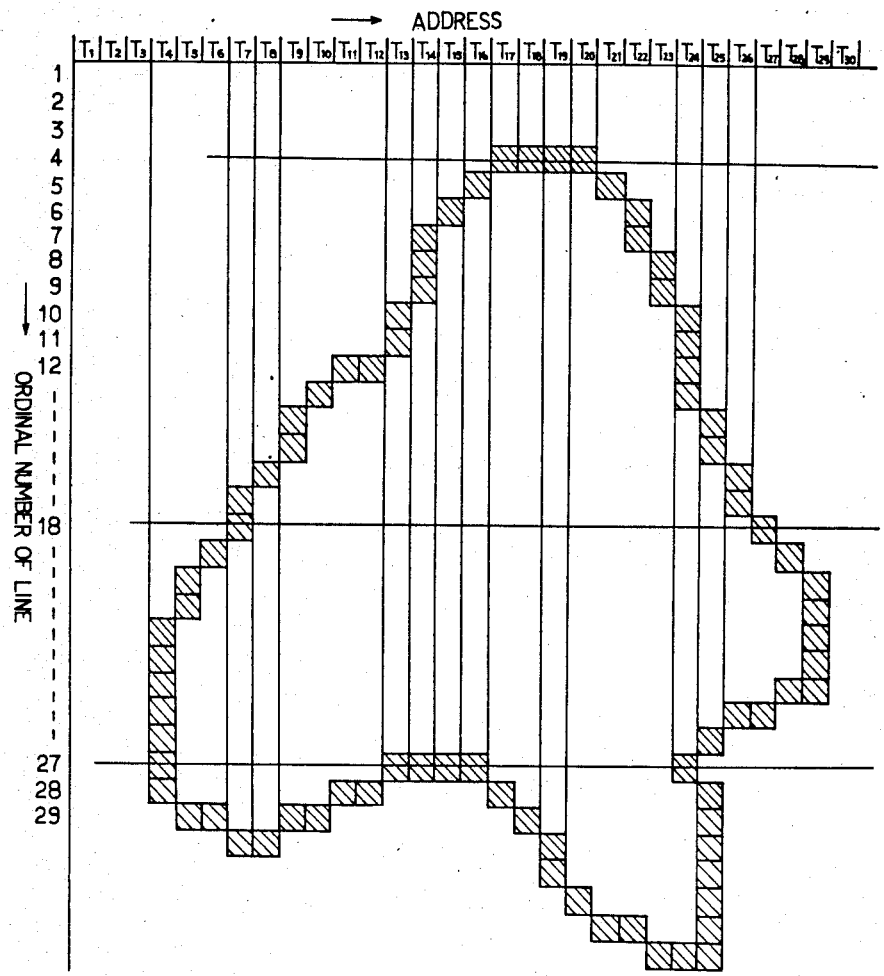
FIG.12-b
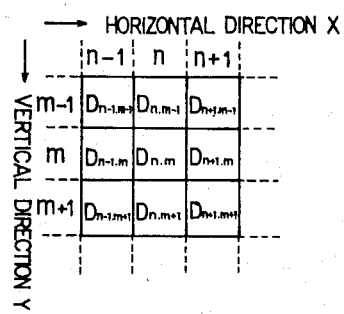

FIG.13-a
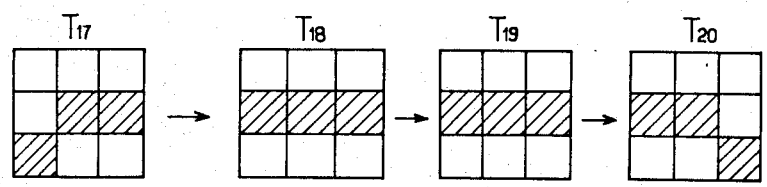
FIG.13-b
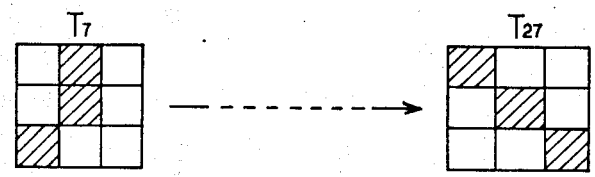
FIG.13-c
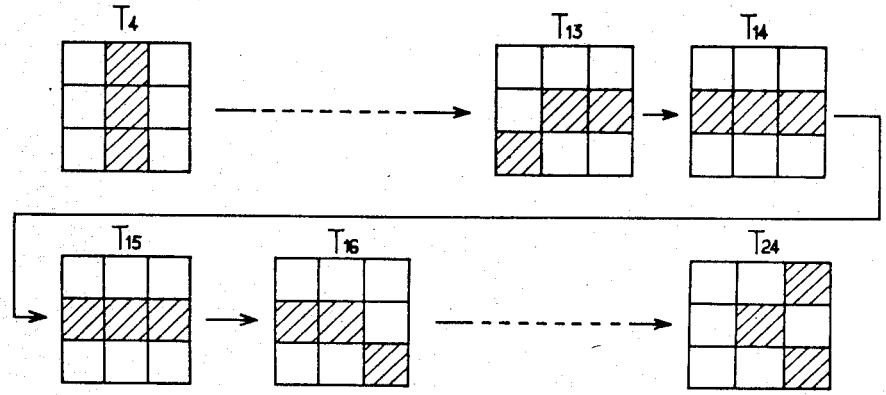

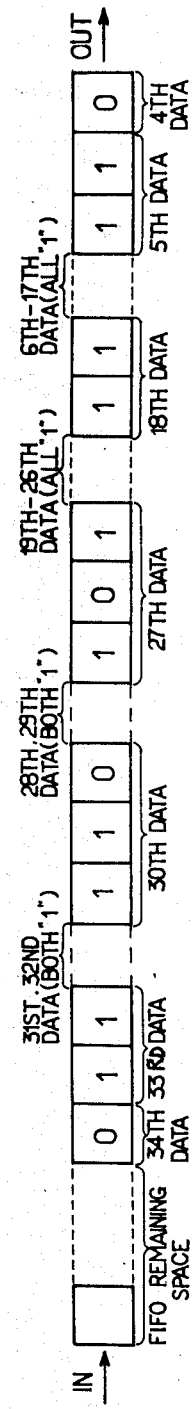
FIG. 14
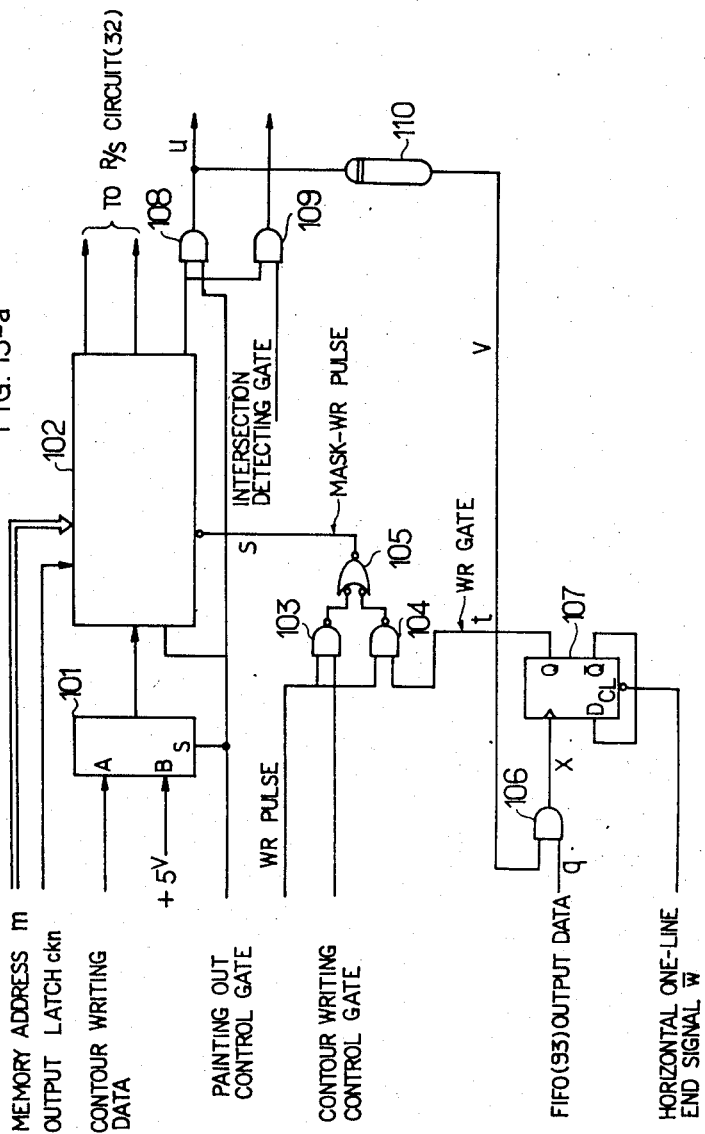
FIG. 15-a

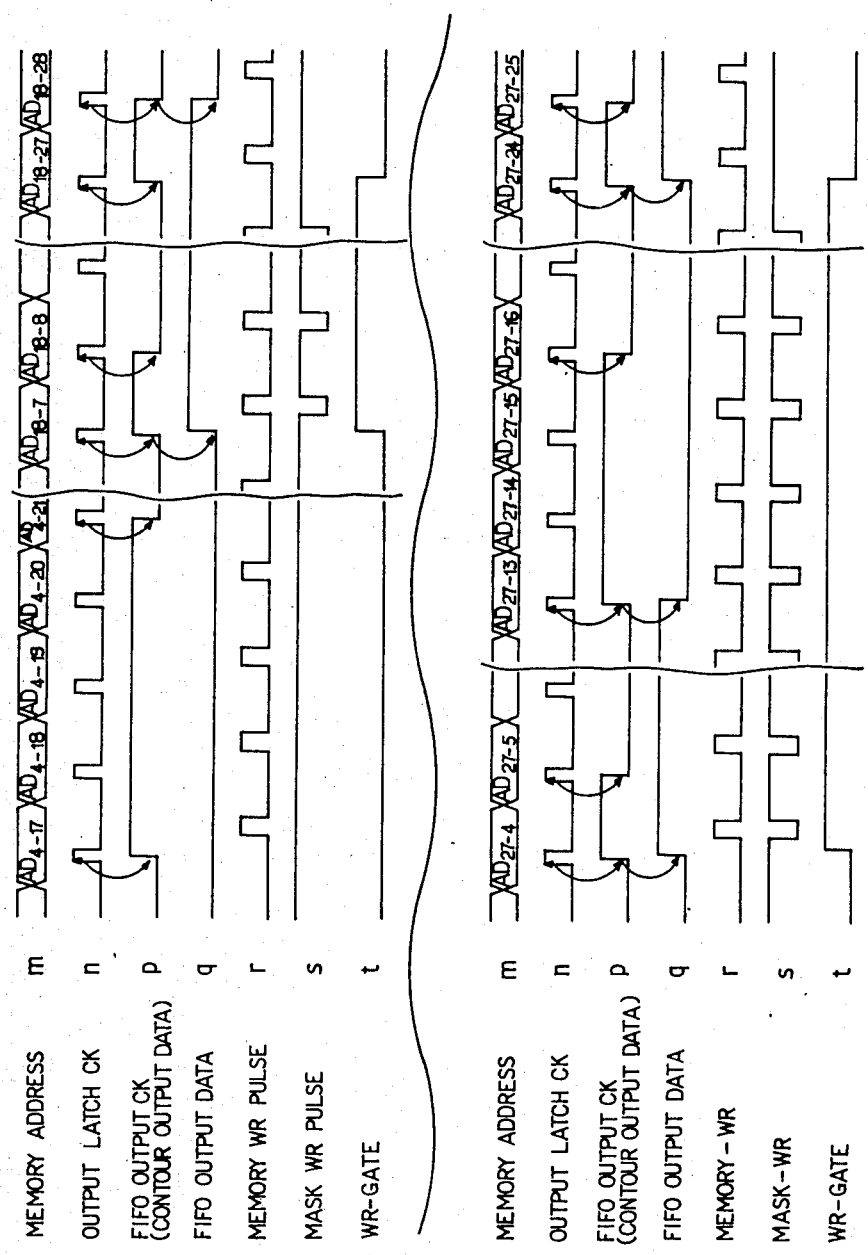

FIG.16-a
<PATTERN 1>
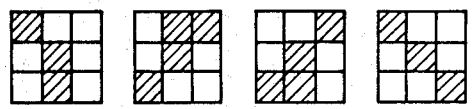
| | | |
|---|---|---|
| INTERSECTION SIGNAL | (a) | 1 |
| HOLD SIGNAL | (b) | 0 |
| HOLD CANCEL SIGNAL | (c) | 0 |
| CONTOUR DIRECTION SIGNAL 1 | (d) | 1 |
| CONTOUR DIRECTION SIGNAL 2 | (e) | 1 |
| TANGENT SIGNAL | (f) | 0 |
<PATTERN 2>
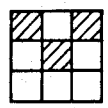
(a) 1
(b) 0
(c) 0
(d) 1
(e) 0
(f) 1
<PATTERN 3>
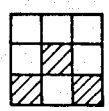
(a) 1
(b) 0
(c) 0
(d) 0
(e) 1
(f) 1
<PATTERN 4>
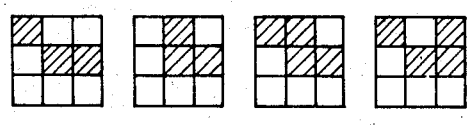
(a) 1
(b) 1
(c) 0
(d) 1
(e) 0
(f) 0
<PATTERN 5>
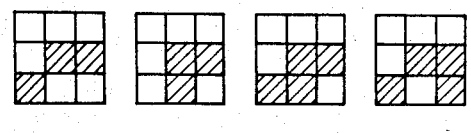
(a) 1
(b) 1
(c) 0
(d) 0
(e) 1
(f) 0

FIG. 16-b
<PATTERN 6>
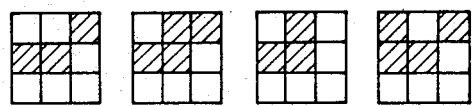
| | | |
|---|---|---|
| INTERSECTION SIGNAL | (a) | 1 |
| HOLD SIGNAL | (b) | 0 |
| HOLD CANCEL SIGNAL | (c) | 1 |
| CONTOUR DIRECTION SIGNAL 1 | (d) | 1 |
| CONTOUR DIRECTION SIGNAL 2 | (e) | 0 |
| TANGENT SIGNAL | (f) | 0 |
<PATTERN 7>
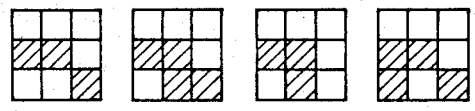
(a) 1
(b) 0
(c) 1
(d) 0
(e) 1
(f) 0
<PATTERN 8>
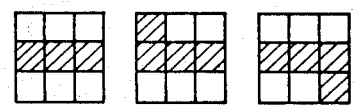
(a) 1
(b) 1
(c) 0
(d) 0
(e) 0
(f) 0
<PATTERN 9>
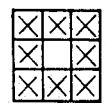
(a) 0
(b) 0
(c) 0
(d) 0
(e) 0
(f) 0

FIG.17
(a)　　(b-1)　(b-2)　　　(c)
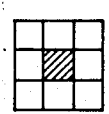 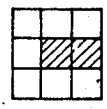 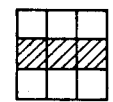 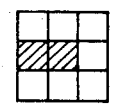
(d-1)　(d-2)　　　(e-1)　(e-2)
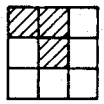 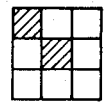 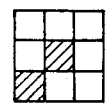 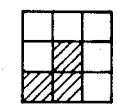
(f-1)　(f-2)
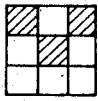 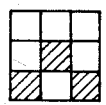

FIG.19
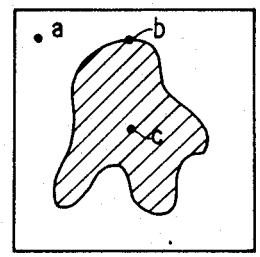
FIG.20
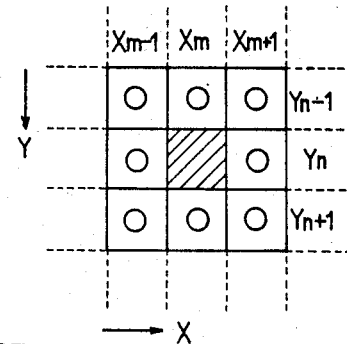
FIG.23
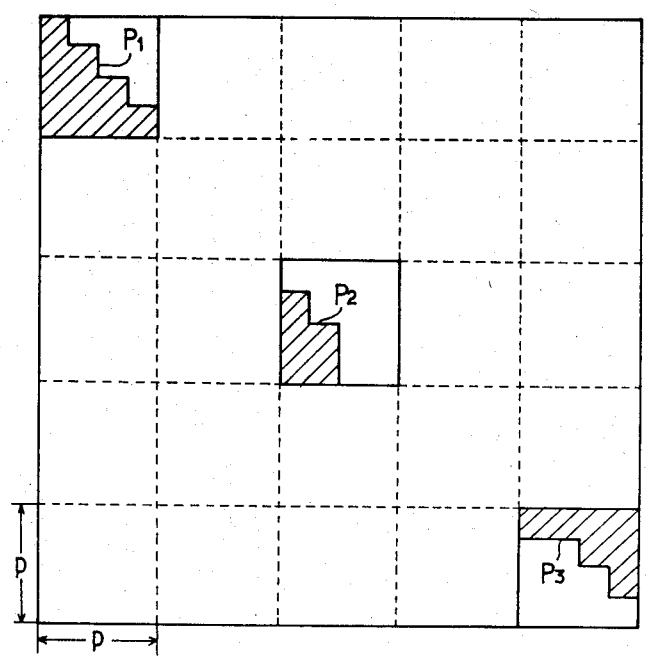
FIG.24
| $a_1$ | $a_5$ | $a_9$ | $a_{13}$ |
|---|---|---|---|
| $a_2$ | $a_6$ | $a_{10}$ | $a_{14}$ |
| $a_3$ | $a_7$ | $a_{11}$ | $a_{15}$ |
| $a_4$ | $a_8$ | $a_{12}$ | $a_{16}$ |

METHOD FOR MANUFACTURING ELECTRIC MASKS USING A COLOR SCANNER AND AN APPARATUS FOR USE THEREIN

BACKGROUND OF THE INVENTION

1. Field of the Invention

This invention relates to a method for manufacturing electric masks using a color scanner and an apparatus for use therein intended to make separation plates while cutting out electric masks, in the process of scanning a color original picture by means of a color separation scanning optical system and photoelectrically scanning on the input drum of the color scanner for recording the color separation plates of said original picture based on the output signal thereof.

2. Description of the Prior Art

The process of cutting out masks while photoelectrically scanning the original picture by means of a conventional TV camera, solid image pickup element or the like was disclosed as a method of solidly painting within the electric mask and magnifying as, for example, "Image scanning and recording method having a retouch function" (the Japanese Unexamined Patent Publication Sho. No. 58-211155; hereinafter referred to as Japanese Publication A) and "Method and apparatus of image scanning and recording having a retouch function (the Japanese Unexamined Patent Publication Sho. No. 58-211154; hereinafter referred to as Japanese Publication B), and furthermore in the Japanese Unexamined Patent Publication Sho. No. 58-37647 entitled "Electric mask manufacturing method" (hereinafter referred to as Japanese Publication C), a method of reproducing a contour signal simultaneously, when scanning the original picture, making or preparing electric masks by using color monitor, overlaying on the picture signal by using this electric mask image, and reproducing only the inside of the electric mask on the recording film as the image was proposed.

However, in said Japanese Publications A and B, since the electric masks are manufactured from the image obtained by TV camera, it was extremely difficult in practical use to match the position between the electric mask and the output image depending on the origin position of the image when the original picture is adhered on the input drum, the angle to the drum when adhered or the deviation of original picture sheet itself.

In said Japanese Publication C, on the other hand, since it is intended to generate the contour signals serving as the basis of the electric masks simultaneously when scanning the original picture, the electric mask and the output image are matched accurately, but since all the scanned image signals are written into a large capacity recording medium such as a memory disk and electric masks are manufactured at a separate layout operation unit aside from the scanner operation unit, it was difficult to deliver (or output) the image in the electric mask easily onto a recording film.

SUMMARY OF THE INVENTION

In order to solve the above-discussed problems of the conventional methods and apparatuses, it is a primary object of this invention to provide a method for manufacturing electric masks using a color scanner comprising a step of determining a specified cutout area prior to the usual scanning of the original picture adhered to an input drum, a step of roughly scanning the determined cutout area in coarse scanning conditions, a step of displaying the picture obtained by the rough scanning on a color CRT monitor and manufacturing electric masks from the displayed picture, a step of scanning in a customary manner, and a step of printing only the picture data in the electric mask out of the picture being scanned on real time at the time of the scanning on the recording film mounted on the recording drum, wherein position matching between the electric mask and its object image (which was extremely difficult conventionally) is easily achieved, and a picture being cut out at high precision can be recorded on the recording film.

Another object of this invention is to provide an apparatus for use in said method.

In the description herein, rough scanning means scanning at pitch several times (four times in the embodiments given below) coarser than the scanning pitch at the time of actually exposing and recording the image on the recording film.

The method for manufacturing electric masks using a color scanner comprising a CRT monitor 25 and coordinate input devices 20, 21 according to this invention is characterized by a step of setting a cutout area of an original picture 2 adhered onto an input drum 1 by means of the coordinate input devices 20, 21 prior to duplicating and recording process, a step of roughly scanning the picture in the cutout area on rough scanning conditions at coarser pitch than the scanning pitch in duplicating and recording process, a step of averaging the picture signal obtained by the rough scanning to be converted into rough sampling data in order to display it on the CRT monitor 25 as a picture, a step of displaying the rough sampling data on the CRT monitor 25 as an image with the origin matched by means of the coordinate input devices 20, 21, a step of displaying a contour of desired electric mask on said picture by means of the coordinate input devices 20, 21 while observing the displayed picture and writing the contour into the control memory 29, a step of making an electric mask by painting out the contour, a step of writing the electric mask data obtained at the previous step into the control memory 29, a step of reading out the electric mask data once written into the control memory 29 at the time of subsequent ordinary scanning in tune with the output timing of the picture data, and a step of masking the picture data on real time.

An apparatus for manufacturing electric masks using a color scanner comprising a CRT monitor 25 and coordinate devices 20, 21 according to this invention is characterized by a scanner controller for determining rough scanning condition for scanning roughly prior to usual scanning, the picture in a cutout area being set by coordinates input devices 20, 21 in the original picture adhered to an input drum in an electric mask manufacturing apparatus, a thinning and smoothing circuit 23 for scanning roughly according to said rough scanning condition and averaging the picture signal to form into rough sampling data in order to display the picture signal obtained by rough scanning on the CRT monitor 25 as a picture, a background memory 27 of the CRT monitor 25 for writing said rough sampling data in, a cursor generating circuit 28 for reading out the rough sampling data from the background memory 27 and generating a desired electric mask on the image while observing the image displayed on the CRT monitor with the origin matched by means of the coordinate input devices 20, 21, a painting out control circuit 30 for painting out the contour of said electric mask, and a control memory 29 for writing in the electric mask data obtained at the time of manufacture of the electric mask.

In the method for manufacturing electric masks using a color scanner and the apparatus for use therein of this invention, prior to usual scanning of the original picture adhered to the input drum, a specified cutout area is determined, this determined cutout area is roughly scanned in specified rough scanning condition, the picture data obtained by this rough scanning is displayed on the color CRT monitor as a picture, an electric mask is manufactured on the basis of this displayed picture, while the electric mask data is simultaneously written into the memory, being followed by usual scanning, the mask data is read out of the memory to the image data at the time of scanning in tune with the output timing of the image data, this image data is masked on real time, and only the image data in the electric data is printed on a recording film on the recording drum, so that the matching of position between the electric mask and its object picture, which was extremely difficult in the prior art, may be easily achieved without resort to large-capacity recording medium, and that the precision of electric mask may be enhanced by interpolating the electric mask data by means of smoothing pattern. As a result, a picture being cut out at high precision may be formed on a recording film.

Other objects and advantages of this invention will become apparent from the detailed description to follow in conjunction with the accompanying drawings.

BRIEF DESCRIPTION OF THE DRAWINGS

In the accompanying drawings forming a part of this application and in which like parts are designated reference numerals throughout the same.

FIG. 2 is a perspective view showing the original picture adhered to an input drum and its cutout area;

FIG. 3-a is a block diagram showing an example of thinning and smoothing circuit, FIG. 3-b is its timing chart, FIG. 3-c and FIG. 3-d are schematic drawings of the timing;

FIG. 4 is a drawing to explain the sampling data of each picture element positioned in the absolute coordinates at the time of rough scanning;

FIG. 5 is a schematic view illustrating the data obtained by averaging the sampling data shown as the object of averaging in FIG. 4;

FIG. 6 is a schematic view of the picture display area of a color CRT monitor;

FIG. 7 is a perspective view showing the state of tracing of the contour of electric mask by means of a digitizer;

FIG. 8 is a schematic view illustrating the trajectory corresponding to the contour of the electric mask displayed on the color CRT monitor;

FIG. 11-a is a diagram of painting control circuit and FIG. 11-b is a timing chart of intersecting point detecting circuit;

FIG. 12-a is a typical view of contour line and FIG. 12-b shows nine units of data being read out;

FIG. 13-a, FIG. 13-b and FIG. 13-c are views of contour data;

FIG. 14 is a schematic view of data storage in the FiFo;

FIG. 15-a shows a detail of a control circuit and FIG. 15-b a timing chart of painting out;

FIG. 16-a and FIG. 16-b show ROMs 81, 81;

FIG. 17 shows signals (a) to (f);

FIG. 19 shows an electric mask data type;

FIG. 20 is a diagram showing the relation between the read-out mask data and the surrounding mask data;

FIG. 23 is a smoothing pattern diagram;

FIG. 24 is an example of arrangement pattern; and

BRIEF DESCRIPTION OF THE PREFERRED EMBODIMENTS

The preferred embodiments of the present invention are described below in reference to the accompanying drawings.

Figure 1:
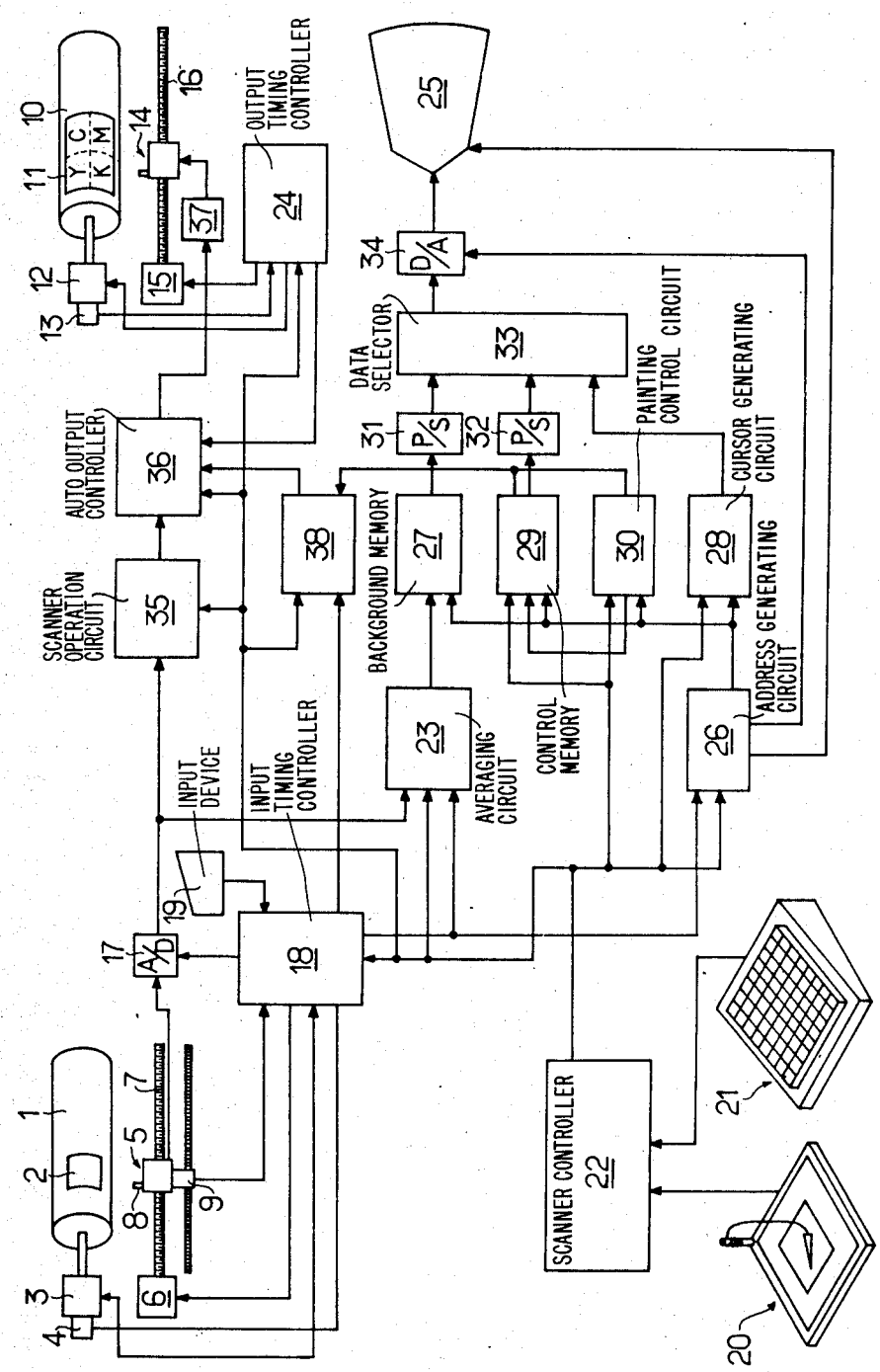
FIG. 1 is a block diagram showing the entire structure of one of the embodiments of the apparatus for manufacturing electric masks using a color scanner of this invention.

FIG. 1 shows one of the embodiments of the apparatus used in the embodiment of the method of this invention in the form of a block diagram, in which numeral 1 denotes an input drum to which an original picture 2 is adhered, 3 is a main motor for rotating and driving said input drum 1 in the principal scanning direction, 4 is a rotary encoder being mounted coaxially on said main motor 3 to generate a specified number of pulse signals at every revolution, and 5 is an input scanning head being moved in the sub-scanning direction of a feed screw 7 being driven by a transverse feed motor 6, and it is furnished with a linear encoder 9 comprising a pickup lens 8 for photoelectrically scanning the original picture 2 in the sequence of scanning lines and a magnetic head for reading the scale being recorded in, for example, magnetization pattern at constant pitch of the reference graduations disposed parallel to the feed screw 7. These components make up the input scanning system of a color scanner.

Furthermore, numeral 10 is a recording drum to which a recording film 11 is adhered, 12 is a motor for rotating and driving said recording drum 10 in the principal scanning direction, 13 is a rotary encoder being mounted coaxially on said motor 12 to generate a specified number of pulse signals at every revolution, and 14 is an output scanning head moved in the sub-scanning direction on a feed screw 16 driven by a transverse feed motor 15 so as to expose the recording film 11 at a specified separation color beam intensity in the sequence of scanning lines depending on the picture signal from said input scanning system or printing mode. These components make up the output scanning system of the color scanner.

Moreover, numeral 17 is an A/D converter circuit for converting the picture signal from the input scanning head 5 into a digital signal, and 18 is an input timing controller which controls as follows: a sampling pulse signal in the principal scanning direction (Y-direction) is input from the rotary encoder 4 and a sampling pulse signal in the sub-scanning direction (X-direction) is input from the linear encoder 9, and the digital conversion timing in the A/D converting circuit 17 is controlled, and when a command signal is input from an input device 19 and processed as follows, the pickup lens 8 of the input scanning head is positioned in the desired position, and, for example in case of rough scanning, the desired rough scanning data is input from the scanner controller 22, and the rotation of the main motor 3 and transverse feed motor 6 is controlled accordingly.

Incidentally, an arbitrary point on the input drum 1 may be expressed by the absolute coordinates (X, Y) by determining, as shown in FIG. 2, the position in the principal scanning direction (Y-direction) by counting the number of pulses generated by the rotary encoder 4 and clearing the counter by the pulse generated once per revolution, and the position in the sub-scanning direction (X-direction) by counting the pulse signals of the linear encoder 9.

Meanwhile, within the original picture 2 glued on the input drum 1, a rectangular area (a cutout area) indicated by cross hatching which contains an electric mask region inside is designated by using said absolute coordinates (X, Y).

In this designation, by driving the transverse feed motor 6, the input scanning head 5 is moved in the sub-scanning direction (X-direction), and the input drum 1 is manually turned in the principal scanning direction (Y-direction), and the pickup lens 8 is caused to match with the origin, that is, the minimum coordinate point P in said cutout area. Then the absolute coordinate values of this cutout origin P are recorded in the memory in the timing controller 18, and, to define this cutout area, a point on the diagonal line corresponding to the cutout origin, that is, the maximum coordinates point Q in the cutout area is similarly recorded in the same memory.

After thus recording the minimum and maximum coordinate points P and Q in the cutout area, the data necessary for determining the scanning condition of the original picture (magnification factor, number of scanning lines, printing data, etc.) is input into the scanner controller 22 by using digitizer 20 or terminal 21.

In this scanner controller 22, the following operational program is preset, and when said data is fed, necessary calculations are performed as follows according to this program, so that the rough scanning condition is established:

$$D_x = (x_n - x_o) a \cdot l \quad (a)$$

$$D_y = (y_n - y_o) a \cdot l \quad (b)$$

$$A - 1 < \frac{D_x}{M} \leqq A \quad (c)$$

$$B - 1 < \frac{D_y}{M} \leqq B \quad (d)$$

$$L = \frac{l}{C} \quad (e)$$

-continued $$f_s = \frac{\pi R N l}{C} \quad (f)$$

where $D_x$ is the number of sampling data items in the sub-scanning direction (X-direction) in the cutout area, $D_y$ is the number of sampling data items in the principal scanning direction (Y-direction) in the cutout area, $x_n$ is the maximum cutout coordinate in the X-direction, $x_o$ is the minimum cutout coordinate in the X-direction, $y_n$ is the maximum cutout coordinate in the Y-direction, $y_o$ is the minimum cutout coordinate in the Y-direction, a is the distance (in inches) of one coordinate, that is, between two adjoining coordinates in the X- or Y-direction, l is the number of scanning lines per inch in transverse feed, that is, in the sub-scanning direction (X-direction) or in the rotating direction, that is, in the principal scanning direction (Y-direction), M is the number of display data items of color CRT monitor, being identical (for example 512) in the horizontal and vertical direction, A and B are integer variables, C is the integer indicating A or B whichever the greater, L is the number of transverse feed lines per inch in rough scanning, $f_s$ is the sampling frequency in rough scanning, R is the diameter of input drum 1, and N is the rotating speed (revolutions per second) of the input drum 1.

In rough scanning at the number of transverse feed lines l determined in eq. (e), if the number of data items $D_x$, $D_y$ is greater than the number of data display items M, or if the number of lines L exceeds the limit of the transmitting light of the original picture 2 to the pickup lens 8 or the size of the optical slit for sampling (not shown) for emitting the reflected light therefrom, the integer C of the denominator in eq. (e) is set as C/2, C/3, C/4 and so forth, while the number of transverse scanning lines is 2L, 3L, 4L and so forth.

In this way, when the rough scanning data is deter mined at the scanner controller 22, these items of data are preset so as to be fed into the background memory 27 from the scanner controller 22 by way of input timing controller and thinning and an averaging circuit 23 which is described later, so that the preparation for rough scanning is over.

In the thinning and averaging circuit 23, when the rough scanning data is preset in the specified hardware as stated above and the picture signal applied from the pickup lens 8 is digitized in the A/D converter circuit 17, if the number of sampling data items $D_x$ or $D_y$ to be digitized is greater than the number of display data items M or if the aperture size is smaller than required, since the sampling data cannot be directly displayed as one picture in the whole screen of the color CRT monitor 25, the data is averaged to be converted into a suitable number of data items or data form. An example of the thinning and averaging circuit for averaging to $\frac{1}{3}$ is shown in FIG. 3-a. For instance, when scanning the coordinates $(X_m, Y_n)$ shown in FIG. 4 to average them in this state, the coordinates to be averaged are nine unit as shown in the shaded area, that is, $(X_{m-1}, Y_{n-1})$, $(X_{m-1}, Y_n)$, $(X_{m-1}, Y_{n+1})$, $(X_m, Y_{n-1})$, $(X_m, Y_n)$, $(X_m, Y_{n+1})$, $(X_{m+1}, Y_{n-1})$, $(X_{m+1}, Y_n)$, and $(X_{m+1}, Y_{n+1})$. Supposing the sampling data at each set of coordinates to be $D_{(m-1, n-1)}$, $D_{(m-1, n)}$, $D_{(m-1, n+1)}$, $D_{(m, n-1)}$, $D_{(m, n)}$, $D_{(m, n+1)}$, $D_{(m+1, n-1)}$, $D_{(m+1, n)}$, and $D_{(m+1, n+1)}$, the averaged data D (K, l) showon in FIG. 5 is expressed in the following equation:

$$D(K,l) = \frac{D_{(m-1,n+1)} + D_{(m-1,n)} + \ldots + D_{(m+1,n+1)}}{3^2}$$

In FIG. 3-a, $T_1$, $T_2$ are input terminals of pulse signal in the X-direction and Y-direction respectively, $G_1$, $G_2$ are trimming gates of the X-direction and Y-direction respectively, $T_3$ is a connecting terminal with the data bus for counter frequency dividing, $T_4$ is a connecting terminal with the data bus for input of averaged coefficient (in the case, $\frac{1}{3}^2$), $T_5$ is a connecting terminal with the data bus for input of sampling data, and D is a delay element.

As described above, in order to be averaged, the sampling data of the eight sets of coordinates surrounding the above as shown in FIG. 4 must be held together with the sampling data of the coordinates $(X_m, Y_n)$, and to achieve this purpose, two one-line buffers 41, 42 are provided along with a total of nine registers, that is, registers $R_1$, $R_2$, $R_3$ for holding the sampling data $D_{(m+1, n+1)}$, $D_{(m+1, n)}$, $D_{(m+1, n-1)}$ of the above coordinates, registers $R_4$, $R_5$, $R_6$ for holding the sampling data $D_{(m, n+1)}$, $D_{(m, n)}$, $D_{(m, n-1)}$, and registers $R_7$, $R_8$, $R_9$ for holding the sampling data $D_{(m-1, n+1)}$, $D_{(m-1, n)}$, $D_{(m-1, n+1)}$, and these one-line buffers 41, 42 are controlled by a one-line buffer control circuit 43. The X-direction frequency dividing circuit 44 and Y-direction frequency dividing circuit 45 are to generate the timing for averaging the sampling data of the above nine units of coordinates. it is an adder 46 that performs the addition of the numerator of the above arithmetic formula for calculating the averaged data D (K, l), and it is a multiplier 47 that multiplies the input of its denominator $\frac{1}{3}^2$.

The timing chart of the thinning and averaging circuit of FIG. 3-a is shown in FIG. 3-b. As evident from this diagram, the output timing of the average data is as shown in FIG. 3-c and FIG. 3-d. That is, when the third item of data on the third line is fed to the thinning and averaging circuit ($D_{33}$ indicated by circle in FIG. 3-c), the data are averaged, and after passing the delayed time of the delay element D in FIG. 3-a, the averaged data $d_{11}$ is output. Thereafter, similarly, the data $d_{12}$ is delivered at the point of data $D_{36}$.

The coordinates to be averaged next to $(X_m, Y_n)$ are $(X_m, Y_{n+3})$.

Now supposing that the preparation necessary for rough scanning is all over as mentioned hereabove, rough scanning is started by the pickup lens 8 of the input scanning head 5 in the cutout area of the original picture 2, and the origin P is reached. From this moment, counting of the writing address to the color CRT monitor 25 is started in the address generating circuit 26, and the rough sampling data delivered from the A/D converter circuit 17 is written into the background memory 27 according to the address designated by the address generating circuit 26 as the rough sampling data as required by the thinning and averaging circuit 23. In turn, the rough sampling data written in the background memory 27 is displayed on real time as a picture in the color CRT monitor 25 by way of a parallel/serial (P/S) converter circuit 31, a data selector 33 and a D/A converter circuit 34, so that the progress of this rough scanning may be known by observing the color CRT monitor 25.

When the pickup lens 8 exceeds the cutout area of the original picture 2, scan stop signals are delivered to the main motor 3 of the input drum 1 and transverse feed motor 6 of the input scanning head 5 from the input timing controller 18, and the both motors 3, 6 are stopped, and rough scanning is over.

To minimize, incidentally, the distortion of the picture shown on the color CRT monitor 25, the picture must be positioned so as to be projected in the central part of the cathode ray tube of the color CRT monitor 25.

Accordingly, prior to starting the rough scanning, it is designed to set by outputting the offset data ($H_{OFF}$), ($V_{OFF}$) calculated in the following equations from the scanner controller 22 to the address generating circuit 26 (see FIG. 6).

The range of M×M in FIG. 6 represents the image display area on the cathode ray tube of the color CRT monitor.

$$H_{OFF} = \frac{M - D_y/C}{2} \tag{g}$$

$$V_{OFF} = \frac{M - D_x/C}{2} \tag{h}$$

Meahwhile, since the principal scanning direction (Y-direction) of the input scanning head 5 and its sub-scanning direction (X-direction) correspond to the horizontal direction (H-direction) and vertical direction (V-direction) respectively on the screen of the color CRT monitor 25, when the rough sampling data in the cutout area of the original picture 2 is written into the background memory 27 of the color CRT monitor 25, the background memory 27 is controlled by the address generating circuit 26 so that the vertical direction address of the CRT may correspond to the principal scanning direction of the scanner, and that the horizontal direction address of the CRT may correspond to the sub-scanning direction of the scanner.

In this manner, the picture in the original cutout area of the original picture 2 by rough scanning is displayed in the image display area being shaded in FIG. 6 of the screen of color CRT monitor 25. In the next step, the method of making an electric mask while observing this display image is described.

In the manufacture of the electric mask, to begin with, a cursor for cutout (the cross cursor shown in FIG. 8) generated by a cursor generating circuit 28 is displayed on the display screen of the color CRT monitor, and this cursor is moved by the operator with the aid of stylus pen as shown in FIG. 7 by means of the coordinate input device, that is, digitizer 20 or terminal 21, while observing the display image on the color CRT monitor 25.

At this time, the origin position necessary for making correspondence to the display address of the color CRT monitor 25 must be input preliminarily to, for example, the digitizer 20.

As the cursor is being moved, the trajectory (or locus) corresponding to the contour of the electric mask is written on real time into the control memory 29, and this trajectory is displayed as shown in FIG. 8 preferentially on the display image of the color CRT monitor 25 by way of the parallel/serial (P/S) converter circuit 32 and the data selector 33, so that the contour of the electric mask can be easily composed.

In this process, unnecessary scratches on the contour line due to drawing error by the stylus pen must be removed by selecting the contour erasure mode and by using the cursor, so that the contour must be formed in a smooth closed loop.

Figure 9:
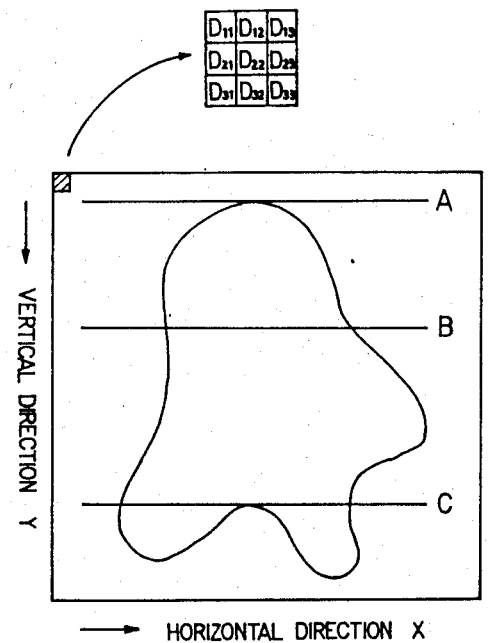
FIG. 9 and FIG. 10 illustrate the sequence of reading out the contour data.
Figure 10:
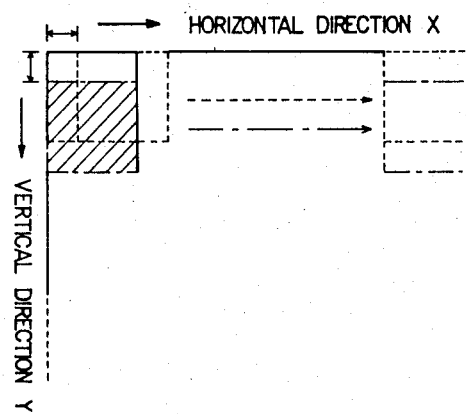

After preparing the contour of the electric mask, next, the area within the contour is painted solidly. In the first place, nine units of contour data ($D_{11}$, $D_{12}$, $D_{13}$, $D_{21}$, $D_{22}$, $D_{23}$, $D_{31}$, $D_{32}$, $D_{33}$) are read out from the upper left position of the display screen (memory address 00) in the horizontal direction as shown in FIG. 9 while moving the horizontal direction in the X-direction by one picture element each as shown in FIG. 10, and these units of data are input to an intersection detecting circuit 96 (FIG. 11-a) in the painting control circuit 30, and the contour intersection data on each horizontal line is written into the first-in first-out memory (FiFo) 93. In the intersection detecting circuit 96, when the register 82 detects the contour data (intersection signal a=1) on each horizontal line, it is determined whether this contour data shows the contour crossing the horizontal line or the contour only in contact with the horizontal line, and the one-bit data to instruct the painting range of each horizontal line is written into the FiFo 93 by the number of intersections.

For example, the operation of the intersection detecting circuit 96 for the contour data shown in FIG. 12-a is described below.

In the first place, as to the fourth line, when the central data is 1, the data change of the 3×3 area becomes as shown in FIG. 13-a. On the 18th line, it becomes as shown in FIG. 13-b, and the 27th line corresponds to FIG. 13-c. The timing chart of the intersection detecting circuit 96 in these cases is shown in FIG. 11-b. The content written in the FiFo 93 is shown in FIG. 14. In short, leaving the details of the operation in the later explanation, all intersection data in every horizontal direction are written in the FiFo 93 as either "0" or "1" information.

The area is then painted out according to these intersections. When painting out it, the contour data is read out by every line in the horizontal direction to the control memory 29, and read/write (RD/WR) processing is carried out for one address, and this memory WR signal is masked by the intersection data, and only the required area is painted solidly. FIG. 15-a demonstrates an example of internal structure of control memory 29, FIG. 15-b shows the timing chart of painting solidly the 4th, 18th and 27th lines in FIG. 12.

Since the circuit of this painting out action is wholly composed of hardware, painting out is done on real time.

The details of the operation in FIG. 11-a are described below.

Nine units of data being read out from the control memory 29 as shown in FIG. 12-b, i.e., $D_{(n-1, m-1)}$, $D_{(n, m-1)}$, $D_{(n+1, m-1)}$, $D_{(n-1, m)}$, $D_{(n, m)}$, $D_{(n+1, m)}$, $D_{(n-1, m+1)}$, $D_{(n, m+1)}$, $D_{(n+1, m+1)}$, are sequentially written into registers 72 to 79, thereby making an access to a contour pattern recognition ROM 81. This ROM 81 generates signal patterns of six bits, that is, intersection signal (a), hold signal (b), hold cancel signal (c), contour direction signal 1 (d), contour direction signal 2 (e) and tangent signal (f), depending on the nine basic patterns as shown in FIG. 16-a, 16-b. These signals (a) to (f) are generated respectively in the following cases, which is explained referring to FIG. 17. The intersection signal (a) is generated when the central $D_{(m, n)}$ out of the nine units of the data is 1 [FIG. 17 (a)].

In the subsequent (b) to (f), meanwhile, the central $D_{(m, n)}$ is always 1. The hold signal (b) is generated when both $D_{(n, m)}$ and $D_{(m+1, n)}$ are both 1, or when $D_{(n-1, m)}$, $D_{(n, m)}$ and $D_{(n+1, m)}$ are all 1 [FIG. 17 (b-1), (b-2)].

The hold cancel signal (c) is generated when both $D_{(n-1, m)}$ and $D_{(n, m)}$ are both 1 [FIG. 17 (c)].

The contour direction signal 1 (d) is generated when one or two of $D_{(n-1, m-1)}$, $D_{n, m-1}$, and $D_{n+1, m-1}$ are 1 [FIG. 17 (d-1), (d-2)].

The contour direction signal 2 (e) is generated when one or two of $D_{(n-1, m+1)}$, $D_{(n, m+1)}$, and $D_{(n+1, m+1)}$ are 1 [FIG. 17 (e-1), (e-2)].

The tangent signal (f) is generated when both $D_{(n-1, m-1)}$ and $D_{(n+1, m-1)}$ are 1 or when both $D_{(n-1, m+1)}$ and $D_{(n+1, m+1)}$ are 1 [FIG. 17 (f-1), (f-2)].

Describing these nine basic patterns on the basis of the conditions above, pattern 1 occurs when $D_{(n, m)}$ is 1, and when one or two consecutive pieces of $D_{(n-1, m-1)}$, $D_{(n, m-1)}$ and $D_{(n+1, m-1)}$ are 1, and when one or two or more consecutive pieces of $D_{(n-1, m+1)}$, $D_{(n, m+1)}$ and $D_{(n+1, m+1)}$ are 1, wherein the intersection signal (a) is 1, hold signal (b) is 0, hold cancel signal (c) is 0, contour direction signal 1 (d) is 1, 2 (e) is 1, and tangent signal (f) is 0. Pattern 2 occurs when $D_{(n, m)}$ is 1 and both $D_{(n-1, m-1)}$ and $D_{(n+1, m-1)}$ are 1, wherein the intersection signal (a) is 1, hold signal (b) is 0, hold cancel signal (c) is 0, contour direction signal 1 (d) is 1, 2 (e) is 0, and tangent signal (f) is 1. Pattern 3 occurs when $D_{(n, m)}$ is 1 and both $D_{(n-1, m+1)}$ and $D_{(n+1, m+1)}$ are 1, wherein the intersection signal (a) is 1, hold signal (b) is 0, hold cancel signal (c) is 0, contour direction signal 1 (d) is 0, 2 (e) is 1, and tangent signal (f) is 1. Pattern 4 occurs when both $D_{(n, m)}$ and $D_{(n+1, m)}$ are 1, and when one or two of $D_{(n-1, m-1)}$, $D_{(n, m-1)}$ and $D_{(n+1, m-1)}$ are 1, and when all of $D_{(n-1, m+1)}$, $D_{(n, m+1)}$, and $D_{(n+1, m+1)}$ are 0, wherein the intersection signal (a) is 1, hold signal (b) is 1, hold cancel signal (c) is 0, contour direction signal 1 (d) is 1, 2 (e) is 0, and tangent signal (f) is 0. Pattern 5 occurs when both $D_{(n-1, m)}$ and $D_{(n, m)}$ are 1, and when all of $D_{(n-1, m-1)}$, $D_{(n, m\ 1)}$ and $D_{(n+1, m-1)}$ are 0, and when one or two of $D_{(n-1, m+1)}$, $D_{(n, m+1)}$ and $D_{(n+1, m+1)}$ are 1, wherein the intersection signal (a) is 1, hold signal (b) is 1, hold cancel signal (c) is 0, contour direction signal 1 (d) is 0, 2 (e) is 1, and tangent signal (f) is 0. Pattern 6 occurs when both $D_{(n-1, m)}$ and $D_{(n, m)}$ are 1, and when one or two of $D_{(n-1, m-1)}$, $D_{(n, m-1)}$ and $D_{(n+1, m-1)}$ are 1, and when all of $D_{(n\ 1, m+1)}$, $D_{(n, m+1)}$ and $D_{(n+1, m+1)}$ are 0, wherein the intersection signal (a) is 1, hold signal (b) is 0, hold cancel signal (c) is 1, contour direction signal 1 (d) is 1, 2 (e) is 0, and tangent signal (f) is 0.

Pattern 7 occurs when both $D_{(n-1, m)}$ and $D_{(n, m)}$ are 1, and when all of $D_{(n-1, m-1)}$, $D_{(n, m-1)}$ and $D_{(n+1, m-1)}$ are 0, and one or two of $D_{(n-1, m+1)}$, $D_{(n, m+1)}$ and $D_{(n+1, m+1)}$ are 1, wherein the intersection signal (a) is 1, hold signal (b) is 0, hold cancel signal (c) is 1, contour direction signal 1 (d) is 0, 2 (e) is 1, and tangent signal (f) is 0. Pattern 8 occurs when all of $D_{(n-1, m)}$, $D_{(n, m)}$ and $D_{(n+1, m)}$ are 1, wherein the intersection signal (a) is 1, hold signal (b) is 1, hold cancel signal (c) is 0, contour direction signal 1 (d) is 0, 2 (e) is 0, and tangent signal (f) is 0. Pattern 9 occurs when $D_{(n, m)}$ is 0, wherein the intersection signal (a) is 0, hold signal (b) is 0, hold cancel signal (c) is 0, contour direction signal (d) is 0, 2 (e) is 0, and tangent signal (f) is 0. In pattern 9, it means that X may be either 0 (white blank) or 1 (black solid). In FIG. 17, (a), (b-1), (c), (d-1), (d-2), (e-1), and (e-2) are for explaining the signals (a) to (f), and they are originally not basic patterns and are not found in the ROM 81. They correspond to the unnecessary scratches or the like mentioned earlier, which are preliminarily erased as stated above.

These signals of 6 bits are latched and stabilized in the register by means of the delay element 80 by the pulses after the output of the ROM 81 is stabilized, and the solid paint control data is written into the FiFo 93 according to the condition of each bit.

The condition to write into the FiFo 93 is that the intersection signal (a) is 1 while the Q output of hold control register 85 is 0. The data to be written into the FiFo 93 is 1 when the contour data crosses the read-out horizontal line, and 0 when it contacts therewith.

Described below are the operation of intersection detection circuit 96 and the control method of writing into the control memory 29 at the time of painting out in three horizontal lines shown in FIG. 12-a (see FIG. 11-a).

A horizontal line end signal $\overline{W}$ is fed at every line to clear the registers 85, 86, 87 by way of NOT circuit 95, and NOR circuits 84, 88. The $\overline{Q}$ output of register 85 becomes 1.

When the fourth line is read out upon detection of an intersection, nine units of data as shown in FIG. 13-a are sequentially fed into the ROM 81, and converted to be input to the intersection detecting circuit 96. As a result, at address 17, the outputs of the register 82, i.e., the intersection signal (a), hold signal (b) and contour direction signal 2 (e) become 1, and the register 85 are preset by way of NOT circuit 83, and the $\overline{Q}$ output becomes 0. On the other hand, the "1" signal (a) input through the delay element 92 becomes 0 in the AND circuit 90, and is input to the FiFo 93 and NOR gate 88 by way of delay elements 92', 92''. Since it is not possible to discriminate whether crossing or contacting the contour by this address information alone, the patterns are sequentially discriminated at the addresses 18 and 19, and at the address 20, the hold cancel signal (c) becomes 1, and the $\overline{Q}$ output of register 85 becomes 1 to be a rise pulse, which is input to the FiFo 93 by way of AND circuit 90 and delay element 92'. At this time, the output judgement data (l) of the AND gate 91 is written into the FiFo 93. In this case, since the contour direction signal (d) does not become 1, the output of the register 86 remains 0, and the data to be written into the FiFo 93 is 0 [the fourth FiFo writing data (l) in FIG. 11-b].

Regarding the 18th line, nine units of data as shown in FIG. 13-b are input to the intersection detecting circuit 96, and at address 7, the outputs of the register 82, that is, the intersection signal (a), contour direction signal 1 (d) and contour direction signal 2 (e) become 1, and the outputs h, i of the registers 86, 87 both come 1. The tangent signal (f) is 0, but is turned to 1 by way of the NOT circuit 89, and the output of the AND circuit 91 becomes 1, so that the judgement data "1" is written into the FiFo 93. In consequence, the rise pulse is applied to the NOR gate 88 through delay element 92'', and the registers 86, 87 are cleared.

At address 27, similarly, "1" is written into the FiFo 93 [the 18th FiFo writing data (l) in FIG. 11-b].

As to the 27th line, nine units of data as shown in FIG. 13-c are input to the detecting circuit 96, and at address 4, the outputs of the register 82, that is, the intersection signal (a), contour direction signal 1 (d) and contour direction signal 2 (e) become 1, and the judgement data "1" is written into the FiFo 93. Then, at addresses 13 through 16, the discrimination data "0" is written into the FiFo 93 same as in the fourth line. At address 24, furthermore, as in the case of address 4, the discrimination data "1" is written into the FiFo 93. At this time, the above discrimination data is arranged in the FiFo 93 as shown in FIG. 14.

Next, the action of painting solid (writing "1") in the contour shown in FIG. 12-a is explained with respect to the 4th, 18th and 27th horizontal lines, in reference to FIG. 15-a (detail of control memory 29) and the timing chart in FIG. 15-b.

Upon completion of read out of every horizontal line, the DFF 107 for WR gate is cleared by horizontal line end signal $\overline{W}$. The painting control gate signal is 1.

As shown in FIG. 12-a, the data is read out in the horizontal direction from address 1 of the first line, and the contour data "1" is read out from the control memory 102 by output latch clock n (output LATCH CK) at address 17 of the fourth line of memory address m. Then a rise signal u changing from 0 to 1 is output through the AND gate 108 in FIG. 15-a.

This rise signal u is input to the clock terminal of FiFo 93, and the first data q (thr fourth data shown in FIG. 14) "0" is output. The data q "0" is input to the AND gate 106 to render zero the clock input x of DFF 107. Accordingly, a rise signal v is input to the AND gate 106 through delay element 110, but the output x remains at 0. Then, at address 21 of the fourth line, the contour data "0" is read out from memory 102, and a fall signal u changing from 1 to 0 is output from the AND gate 108.

The action from the 5th line to the 26th line is identical, and therefore the 18th line is described below.

As mentioned above, the DFF 107 is cleared at every horizontal line. At address 7 of the 18th line, "1" is read out from the control memory 102, and the output u of the AND gate 108 becomes a rise signal, and q "1" is delivered from the FiFo 93. The input of the AND gate is a rise signal v which is applied through the delay element 110, and the input x of the DFF 107 is a rise signal, so that the output t of DFF 107 is 1. When WR pulse is input as pulse S into the control memory 102 by way of gates 104, 105, the data "1" selected through the selector 101 is written into address 7.

Advancing to address 8, "0" is read out from the control memory 102, and the output u of the AND gate 108 becomes a fall signal. However, since the WR pulse r is input as pulse S into the control memory 102 through gates 104, 105, data "1" is written in. Thus, data "1" is written in up to address 26.

At address 27, "1" is read out from the control memory 102, and the output u of the AND gate 108 becomes a rise signal, and q "1" is output from the FiFo 93. The rise pulse x is input through DFF 107 by way of delay element 110 and AND gate 106 to render zero the output t, thereby closing the gates 104, 105. Therefore, the WR pulse r does not enter in the control memory 102, and the horizontal lines remain thereaftrer unchanged.

Similarly, on the 27th line in FIG. 12-a, q "1" is output from FiFo 93 at address 4, and "1" is written in addresses 5 to 12. When q "0" is output from the FiFo 93 at address 13, rise pulse x does not enter in the DFF 107, and the output t of DFF 107 remains at 1, so that "1" is continuously written in up to address 23. At address 24, when q "1" is output from the FiFo 93, the output t of DFF 107 becomes 0, and writing after address 24 is suspended.

In FIG. 15-a, the gate 103 is used when writing the contour. The contour writing is not described here because it is done by a known method. The AND gate 109 rearranges the contour data read out from the memory 102 when the intersection detection gate signal is 1 as shown in FIG. 3-a or selects the memory address m to be arranged as shown in FIG. 12-b, and applies the data to the registers 71 to 79.

Regarding the method of painting out, as a matter of course, both soft processing by central processing unit, if there is a time allowance for processing, and manual painting of each point by stylus pen are possible.

Now the electric mask is completely manufactured in the above process, then it is scanned as usual in the following process.

When the pickup lens 8 of the input scanning head 5 comes to the cutout original of the cutout area of the original picture 2, a sampling pulse is input to the A/D converter circuit 17 from the input timing controller 18. At the same time, the same sampling pulse is fed into the address generating circuit 26 from the input timing controller 18, while at the address generating circuit 26, this input sampling pulse is reduced to 1/C, and a memory read out address of the control memory 29 is generated, and the read out of the electric mask data being written in the control memory 29 is started in tune with the generation timing of the image data with respect to the data output controller 36 by way of a smoothing circuit 38.

At the A/D converter circuit 17, the color separation image signals of red R, green G and blue B being picked up by the pickup lens 8 are converted into digital quantities, and these R, G, B image data items are converted into specified yellow Y, magenta M and cyan C ink quantity data in the scanner operation circuit 35 to be input to the data output controller 36.

Therefore, in the data output controller 36, the individual image data items being converted into Y, M, C ink quantity data are masked on real time, and cutout image signals are generated.

Thus, the generated image signals are once written into one-line buffer in the data output controller 36 so as to be matched in timing, and are read out sequentially in time series according to the output from the output timing controller 24. The signal thus read out, i.e., the yellow image signal is turned into a halftone signal in a dot generating circuit 37. and this halftone signal is printed in the yellow separation plate printing area Y of the recording film 11 on the recording drum 10 by means of the output scanning head 14. The same processing is repeated also on the magenta, cyan and black image signals being read out simultaneously, and are sequentially printed in the magenta, cyan and black separation plate printing areas M, C, K of the recording film 11 respectively.

The above-described printing is presented only as an examle, and it is possible, as a matter of course, to print in other printing modes.

Incidentally, in this apparatus, if the electric mask data is very coarse and waves are obvious on the contour of the manufactured electric mask on the recording film 11, the electric mask data corresponding to this rugged contour may be refabricated into precise electric mask data in the smoothing circuit 38, so that a mask with a smooth contour may be applied to the picture by using this new mask data.

Figure 18:
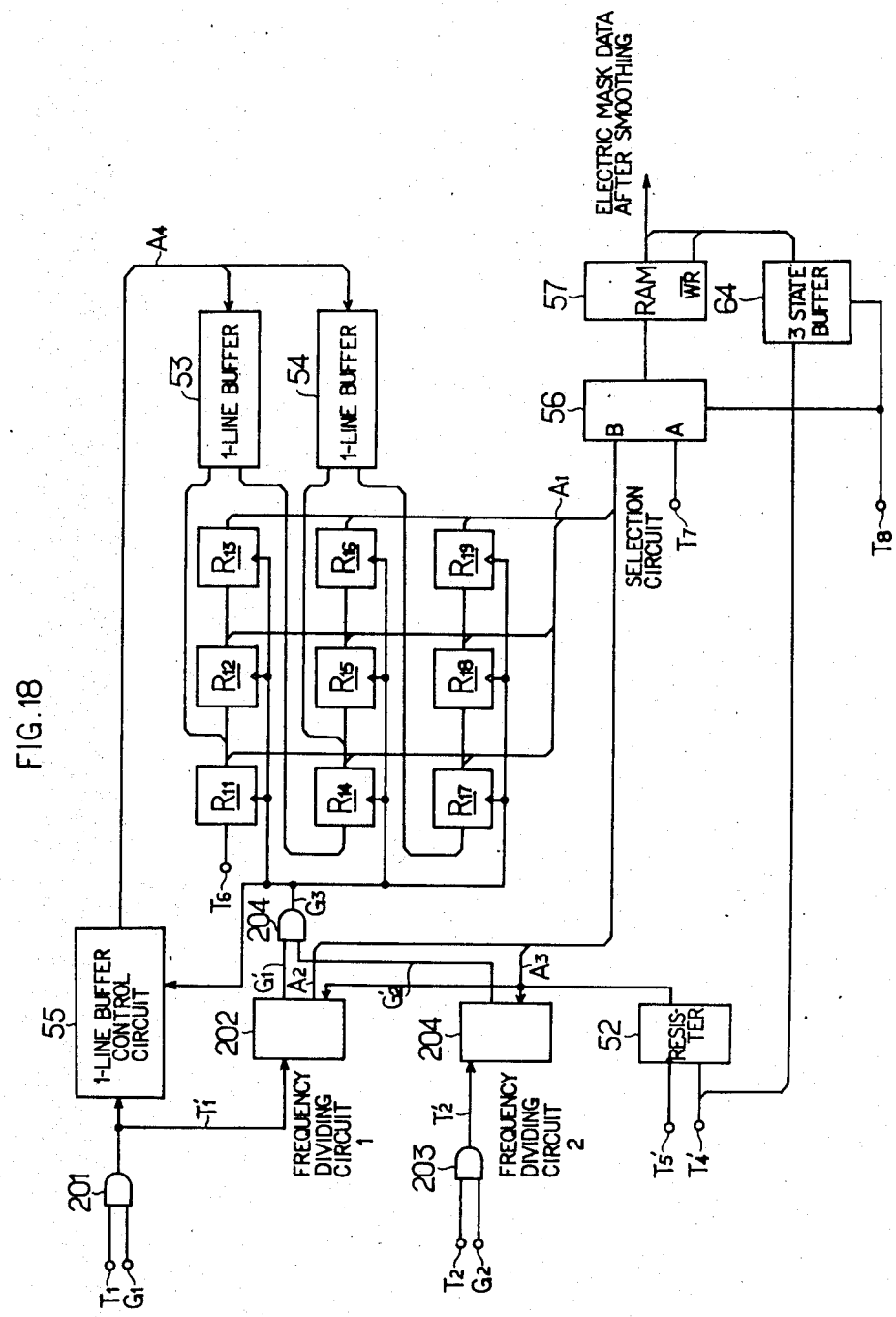
FIG. 18 is a block diagram to show a smoothing circuit.

FIG. 18 is a block diagram showing an example of smoothing circuit 38, in which $T_1$, $T_2$ are input terminals of sampling pulse signals in the X-dreiction and Y-direction respectively, $G_1$, $G_2$ are trimming gates of X-direction and Y-direction, $T_4'$ is a connecting terminal with the data bus from the scanner controller 22 to register 52 and 3-state buffer 64, $T_5'$ is an input terminal of pulse for setting of register 52, and $T_6$ is a connecting terminal of the data bus for feeding electric mask data from the control memory 29.

The one-bit electric mask data of 0 or 1 being read out from the control memory 29 is stored in nine 1-bit registers $R_{11}$, $R_{12}$, $R_{13}$, $R_{14}$, $R_{15}$, $R_{16}$, $R_{17}$, $R_{18}$, $R_{19}$, respectively corresponding to said sampling data $D_{(m+1, n+1)}$, $D_{(m+1, n)}$, $D_{(m+1, n-1)}$, $D_{(m, n+1)}$, $D_{(m, n)}$, $D_{(m, n-1)}$, $D_{(m-1, n+1)}$, $D_{(m-1, n)}$, $D_{(m-1, n-1)}$. The flow of the electric mask data is in the sequence of register $R_{11}$, register $R_{12}$, register $R_{13}$, one-line buffer 53, register $R_{14}$, register $R_{15}$, register $R_{16}$, one-line buffer 54, register $R_{17}$, register $R_{18}$, register $R_{19}$, and the one-line buffers 53, 54 are controlled by one-line buffer control circuit 55.

By the way, the electric mask data being read out of the control memory 29 is divided into three groups as shown in FIG. 19. That is, group (a) comprises the data outside the electric mask area, group (b) comprises the data on the boundary (contour) of the electric mask area, and group (c) comprises the data inside the electric mask area. Since the electric mask data as the object of smoothing processing in group (b), to discriminate that the one set of electric mask data being presently read out belongs to group (b), it is enough to read out the electric mask data (main mask data) of the shaded coordinates $(X_m, Y_n)$ being presently read out as shown in FIG. 20 and the electric mask data of the surrounding eight units of coordinates simultaneously, and confirm that the main mask data is 1 and at least one of the surrounding eight units of the data is not 1. If all of eight units of data are 1, it means the inside which is not subject to smoothing process.

In this case, the main mask data is the electric mask data stored in the register $R_{15}$, and the peripheral data are electric mask data being stored in registers $R_{11}$, $R_{12}$, $R_{13}$, $R_{14}$, $R_{15}$, $R_{16}$, $R_{17}$, $R_{18}$, $R_{19}$, respectively.

In the RAM 57, $2^8 = 256$ kinds of smoothing pattern are preliminarily written from the scanner controller 22, in correspondence to the conditions of the peripheral 8 points, and a proper one is picked up and read out by the selector circuit 56, and the main mask data is smoothed. In other words, the main mask data to be smoothed is interpolated by the selected smoothing pattern.

The address to read out in 256 kinds of smoothing pattern is designed to be generated by the frequency dividing circuit 1 (202) in the X-direction and the frequency dividing circuit 2 (204) in the Y-direction. These frequency dividing circuits 202, 204 are counted by the sampling pulses of the picture data in the X-direction and Y-direction. Meanwhile, $T_7$ is a connecting terminal with the address bus for RAM writing, and $T_8$ is a control signal connecting terminal used when writing a smoothing pattern into the RAM 57 by way of the state buffer 64.

The operation of the circuit in FIG. 18 is as follows. When the X-direction trimming gate is opened, $G_1$ becomes "H", and an X-direction sampling pulse $T_1$ is input to the frequency dividing circuit 1 (202) by way of gate 201, and in the $T_1'$ frequency dividing circuit 1 (202), $\theta$ frequency division is effected so that the output $G_1'$ may become "H" from the first to second $T_1'$, from the fifth to sixth $T_1'$.

When the Y-direction trimming gate is opened, $G_2$ becomes "H", and the Y-direction sampling pulse $T_2$ is input to the frequency dividing circuit 2 (204) by way of gate 203, and in the $T_2'$ frequency dividing circuit 2 (204), $\theta$ frequency division is effected so that the output $G_{2'}$ may becomes "H" from the first to second $T_2'$, from the fifth to sixth $T_2'$.

The latch pulse $G_3$ of registers $R_{11}$ to $R_{19}$ is introduced by way of gate 204 as $G_1'$, $G_2'$.

That is, by the latoh pulse aocording to the rough sampling, the electric mask data from $T_6$ is sequentially latched. The address and control signal $A_4$ to one-line buffer 53, 54 are output from the one-line buffer control circuit 55, and this circuit clears the address by the $T_1'$ signal and counts the address by the $G_3$ signal.

In the smoothing pattern generating RAM 57, meanwhile, a smoothing pattern writing address is introduced through the selector circuit 56 from $T_7$ after the rough sampling condition is determined, and the $\overline{WR}$ pulse and smoothing data are written at the same time from the $T_4'$ terminal through the three-state buffer 64. AT this time, an "L" signal is input to $T_8$ terminal, which changes over the selector circuit 56 and controls the $\overline{ENABLE}$ of the three-state buffer.

In the smoothing action, the smoothing pattern is selected according to the output data $A_1$ of the registers $R_{11}$ to $R_{19}$, and the smoothing patterns selected by counter output addresses $A_2$, $A_3$ in the frequency dividing circuits 1 and 2 (202, 204) are read out, which are used as the electric mask data after smoothing.

Figure 21:
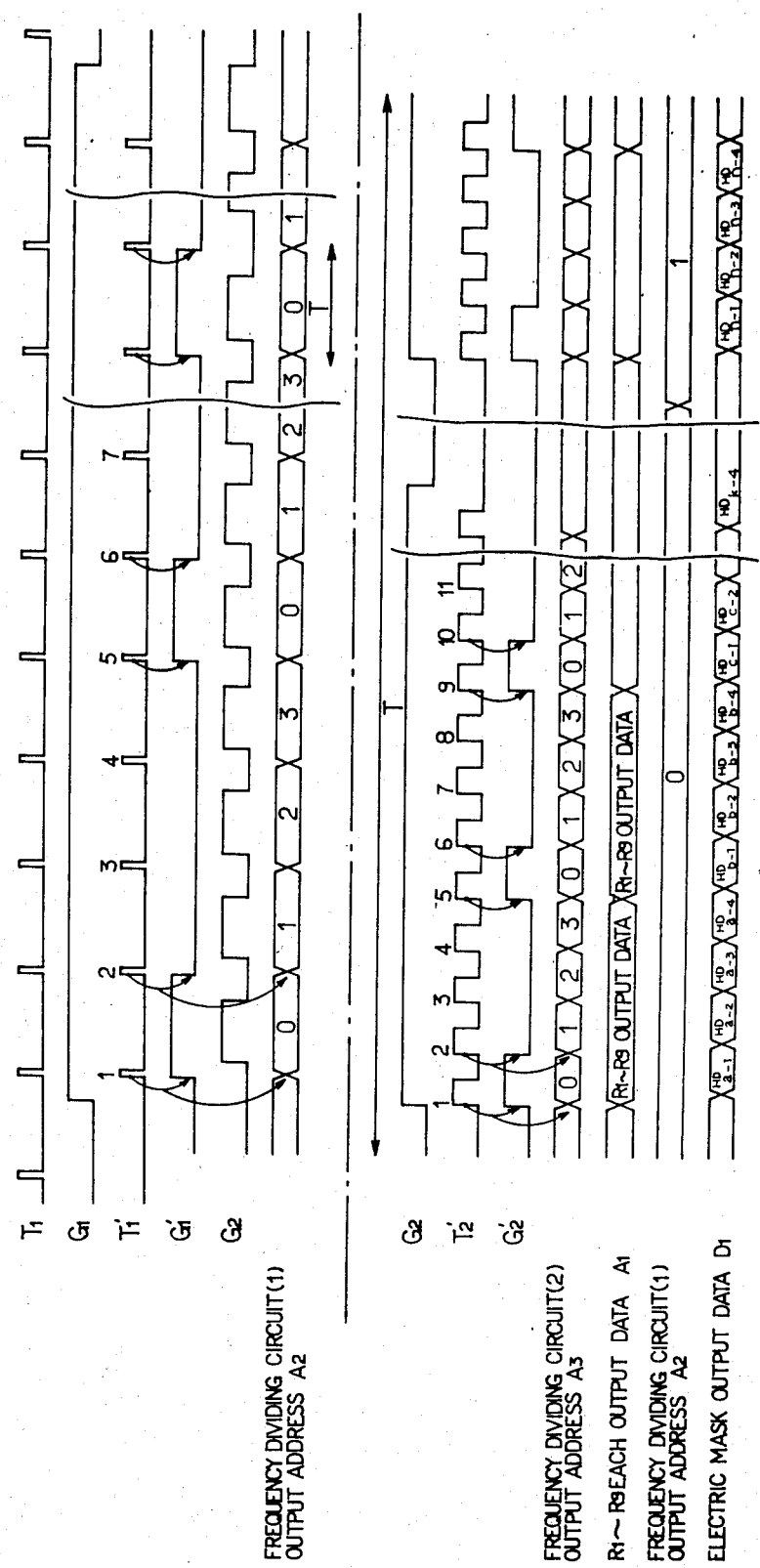
FIG. 21 is an operation timing chart of smoothing circuit.
Figure 22:
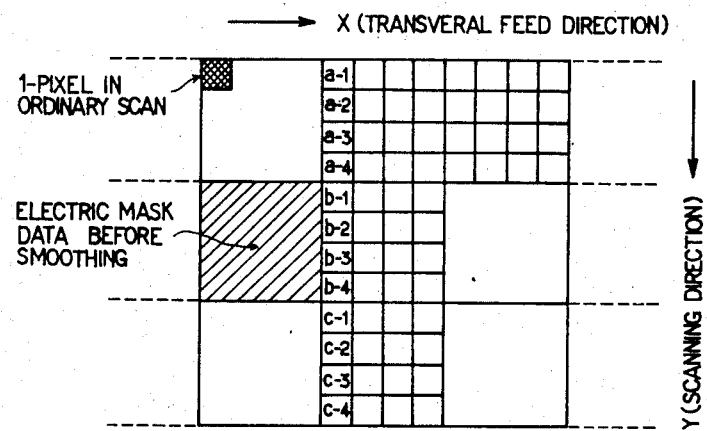
FIG. 22 is a smoothing data configuration in the operation timing chart of the smoothing circuit in FIG. 21.

In the circuit example, in FIG. 18, the timing chart of 4×4 is shown in FIG. 21. FIG. 22 shows the arrangement of the smoothing data as a timing chart shown in FIG. 21.

FIG. 23 shows an example of smoothing pattern of electric mask, in which only three patterns $P_1$, $P_2$, $P_3$ are shown. Actually, these smoothing patterns are formed by adjacently arranging the subdivision pattern composition elements of, for example, 16 divisions $a_1$ to $a_{16}$ corresponding to one picture element in usual scanning as shown in FIG. 24 being divided from P×P one-mask element corresponding to the size of one picture element of rough scanning, and there are $16^2 = 256$ kinds, including the three patterns above, the arangement of $a_2$, $a_3$, $a_4$, $a_7$, $a_8$ in FIG. 24 refers to pattern $P_2$. When smoothing the electric masks, proper ones are selected from these 256 patterns depending on the conditions of the peripheral 8 data items of the main mask data.

Figure 25:
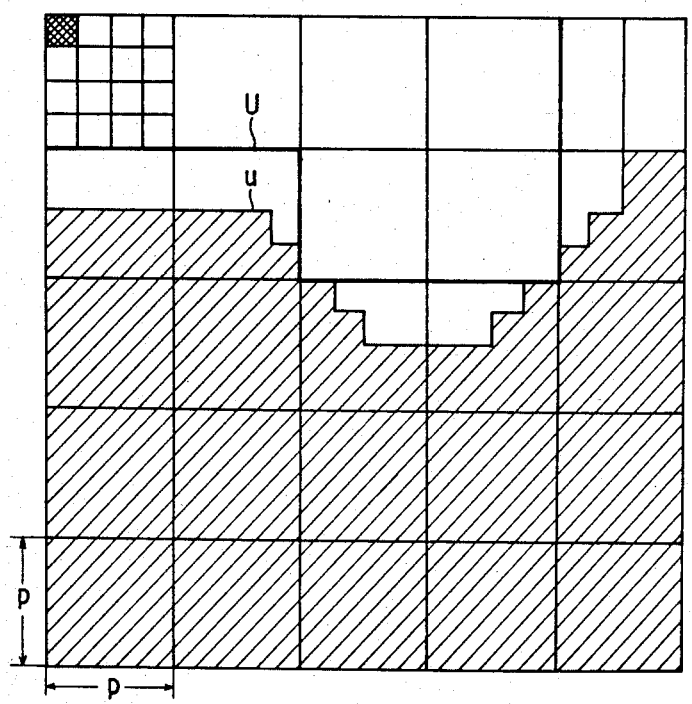
FIG. 25 is an example of smoothing of an electric mask.

FIG. 25 illustrates the contour U of the electric mask before smoothing process and the contour u thereof after smoothing. The cross-hatched area in the upper left corner denotes the area of one picture element in usual scanning.

Having described specific embodiments of this invention, it is believed obvious that modification and variation of this invention are possible in the light of the above teachings.

We claim:

1. A method for manufacturing electric masks using a color scanner having a CRT monitor and a coordinate input device, comprising:

setting a cutout area of an original picture adhered to an input drum by means of the coordinate input device prior to a subsequent step of duplicating and recording;

roughly scanning an image in said output area at a pitch that is coarser than a scanning pitch in said subsequent step of duplicating and recording, so as to obtain a picture signal;

averaging the picture signal obtained by said rough scanning into rough sampling data;

writing said rough sampling data into the background memory of the CRT monitor;

displaying the rough sampling data written in the memory of the CRT monitor as a picture on the CRT monitor as an image having a matched origin by means of said coordinate input device;

displaying a contour of a desired electric mask while writing the contour of the desired electric mask into a control memory on said picture by using the coordinate input device, and observing the display picture;

manufacturing an electric mask by solidly painting out the contour;

writing electric mask data obtained from said step of manufacturing into said control memory;

duplicating and recording said image including scanning of said image;

reading out the electric mask data written into the control memory in synchronization with the output timing of picture data so as to mask the picture data in real time; and interpolating and smoothing the electric mask data written into the control memory by means of a smoothing pattern composed of pattern elements equal in size to picture elements corresponding to the picture data at the time of reading out the mask data in synchronization with the output timing of the picture data.

2. An apparatus for manufacturing an electric mask using a color scanner equipped with a CRT monitor and a coordinate input device, comprising:

a scanner controller provided so as to determine a rough scanning condition for a rough pre-scanning of a picture within a cut out area set by said coordinate input device in an original picture adhered to an input drum;

a thinning and averaging circuit for averaging a picture signal obtained by said rough pre-scanning under said rough scanning condition into rough sampling data so as to display said picture signal as a picture on said CRT monitor;

a background memory of a CRT monitor into which said rough sampling data is writeable;

a cursor generating circuit for generating a contour of a desired electric mask on said picture while observing the picture displayed on the CRT monitor with a matched origin by means of a coordinate input device by reading out the rough sampling data from said background memory;

a painting control circuit provided so as to paint out the contour of said electric mask;

a control memory for writing electric mask data obtained when generating the electric mask; and a smoothing circuit for interpolating and smoothing the electric mask date written in the control memory by means of a lsmoothing pattern composed of pattern elements equal in size to picture elements corresponding to picture data and reading out the mask data in synchronization with the picture data.

* * * * *